Figure 1:
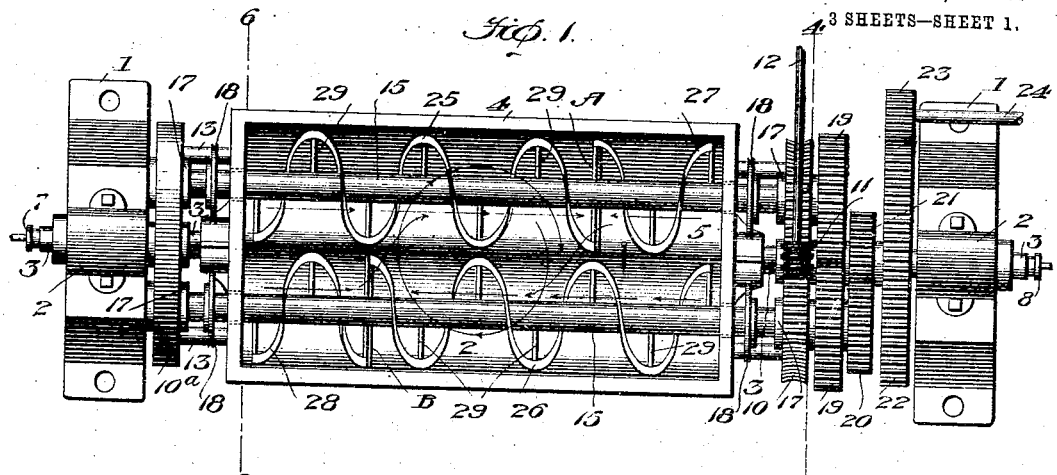

H. TALLEY.
MIXING MACHINE FOR EXPLOSIVES.
APPLICATION FILED JUNE 7, 1909.

946,475.

Patented Jan. 11, 1910.

3 SHEETS—SHEET 1.

Witnesses:

Inventor.
Herbert Talley
by Geo. W. Hamlin
his Attorney

H. TALLEY.
MIXING MACHINE FOR EXPLOSIVES.
APPLICATION FILED JUNE 7, 1909.

946,475.

Patented Jan. 11, 1910.

3 SHEETS—SHEET 2.

Witnesses

Inventor
Herbert Talley
by
His Attorney

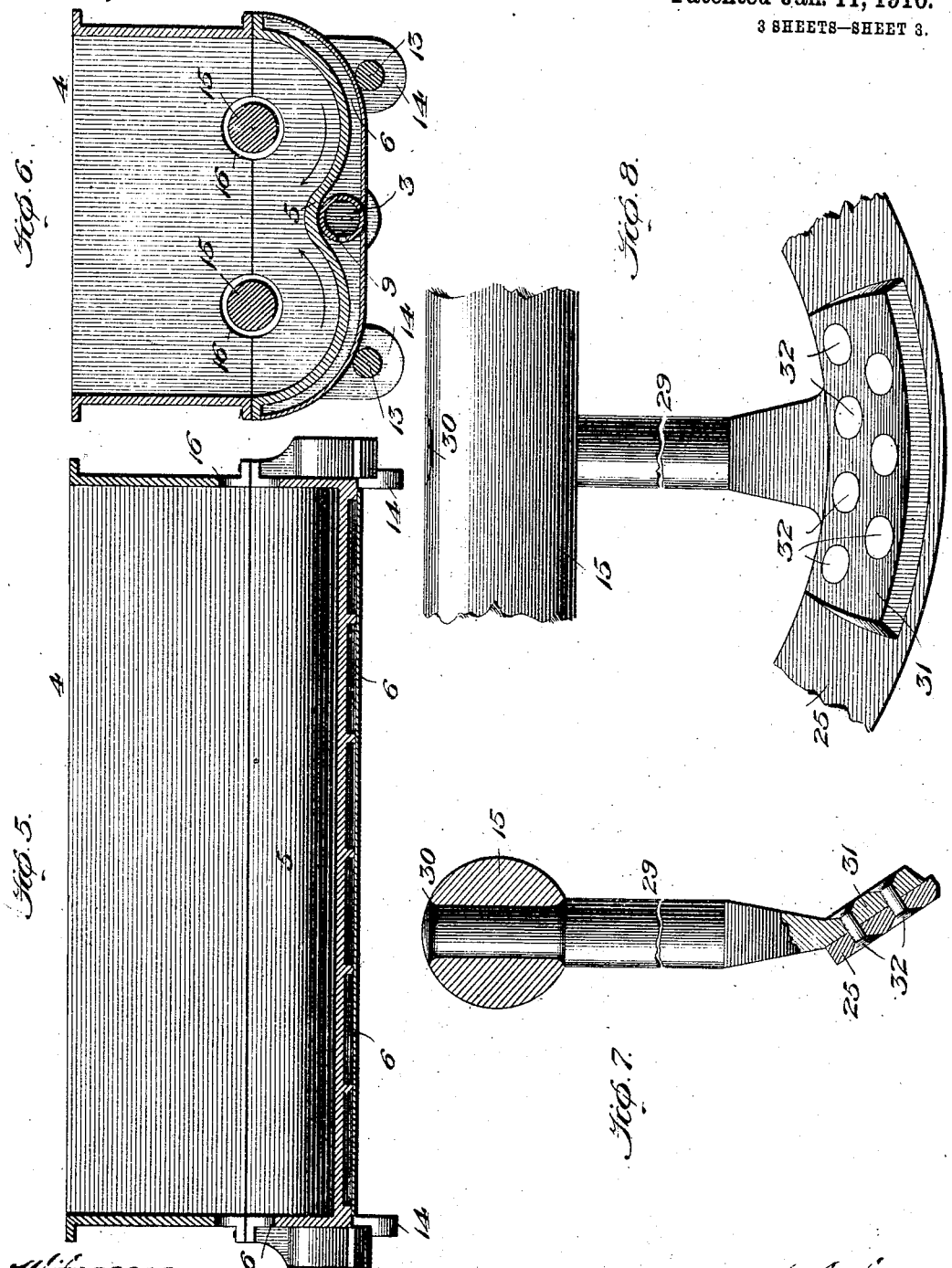

UNITED STATES PATENT OFFICE.

HERBERT TALLEY, OF JOPLIN, MISSOURI, ASSIGNOR TO INDEPENDENT POWDER COMPANY OF MISSOURI, OF JOPLIN, MISSOURI, A CORPORATION OF MISSOURI.

MIXING-MACHINE FOR EXPLOSIVES.

946,475.  Specification of Letters Patent.  Patented Jan. 11, 1910.

Application filed June 7, 1909. Serial No. 500,484.

*To all whom it may concern:*

Be it known that I, HERBERT TALLEY, a citizen of the United States, residing at Joplin, county of Jasper, and State of Missouri, have invented certain new and useful Improvements in Mixing-Machines for Explosives, of which the following is a specification.

This invention relates to mixing machines for explosives.

The present invention relates to that class of mixing machines employing spiral mixers and is adapted for use in mixing any plastic substance, though particularly designed for mixing explosives, especially the materials known as explosive gelatin, gelatin dynamite and dynamite.

The objection to mixing machines employing rotary paddled mixers is that this type of mixer tends to form the material into balls which do not become intimately united until the operation has been carried on for a considerable period. On the other hand, spiral mixers, when used on explosives, have the objection of tending to force the material toward the end of the bowl, if disposed horizontally, and into the bearings of the mixer shafts, with incident danger, and for this reason paddled mixers have been usually employed in mixing explosives although much slower in effecting the desired mixing of the substance.

The present invention has for its object the provision of a novel mixing machine which will be adapted to rapidly effect a thorough and intimate mixing of the substance without danger and with capability of readily dumping the contents of the bowl when desired.

The foregoing object is accomplished by the provision of spiral rotary mixers contained within the mixing bowl and of such novel construction that the material within the bowl will be kept in a cycle of movement and worked inwardly from the parts of the bowl where the mixer shafts pass through; secondly, by employing spiral mixers the ribbons of which are inclined so that they cause a pressing action in a novel manner between the spiral and the mixing bowl and thus intimately mix or knead the material; thirdly, by the provision of larger openings in the bowl than the mixer shafts where the latter pass therethrough in order to obviate friction thereat and in providing disks or collars on the mixer shafts which form an abutment of any of the material which may work through and thus prevent it from getting on the operating parts of the machine; fourthly, in the provision of a novel mounting and gearing for the mixing bowl and the mixers whereby the mixers may be rotated regardless of the position of the bowl and the bowl may be turned to any desired position with facility and ease and for purposes of filling or dumping; and fifthly, in the provision of various instrumentalities of novel construction and arrangement which combine to carry out the purposes of the invention.

Figure 2:
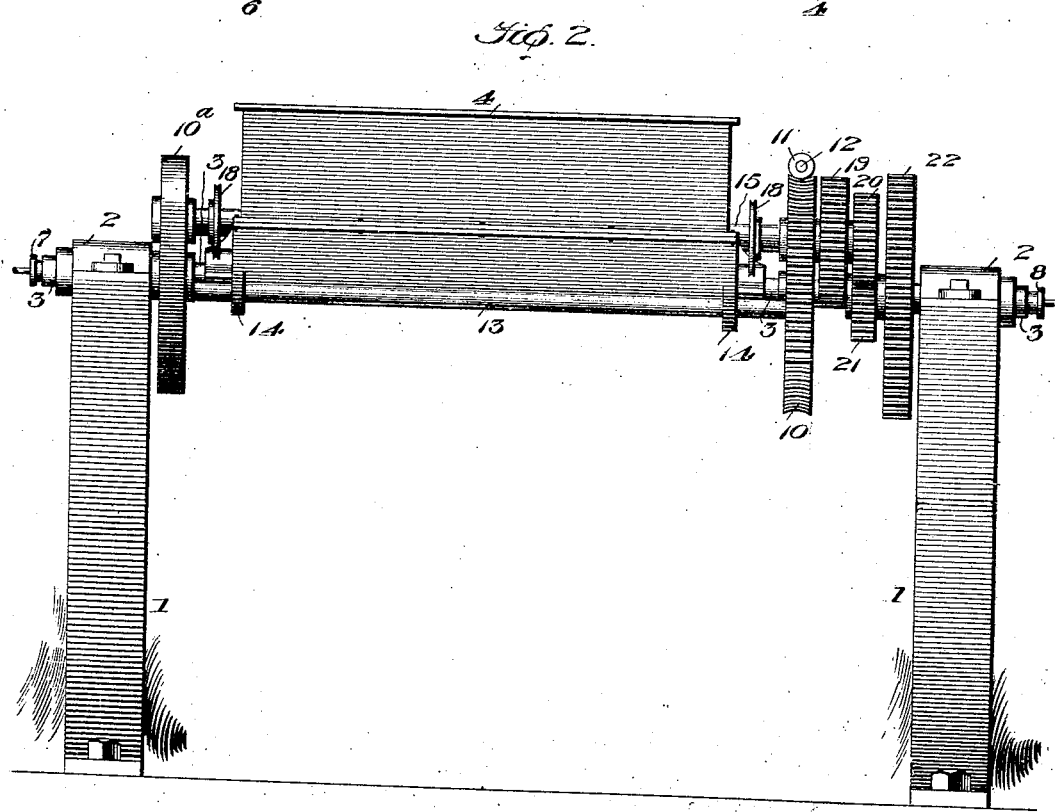
Figure 3:
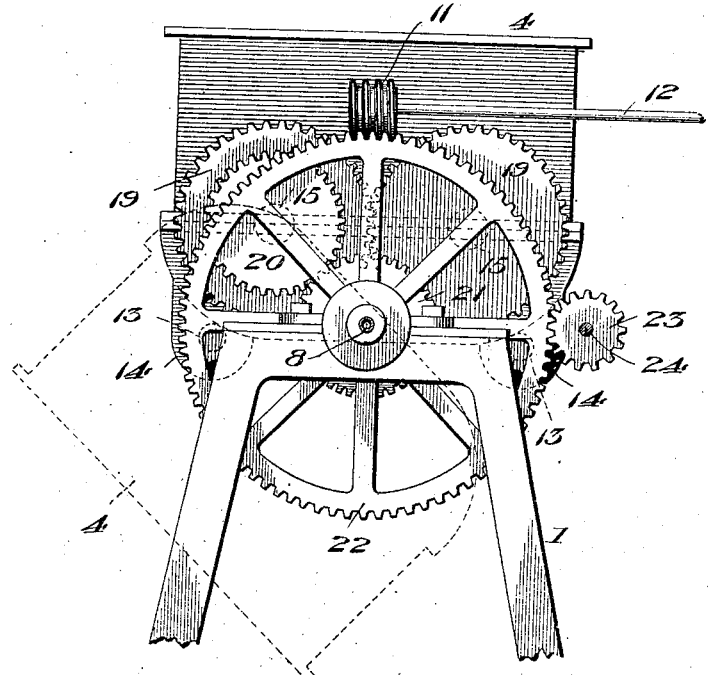
Figure 4:
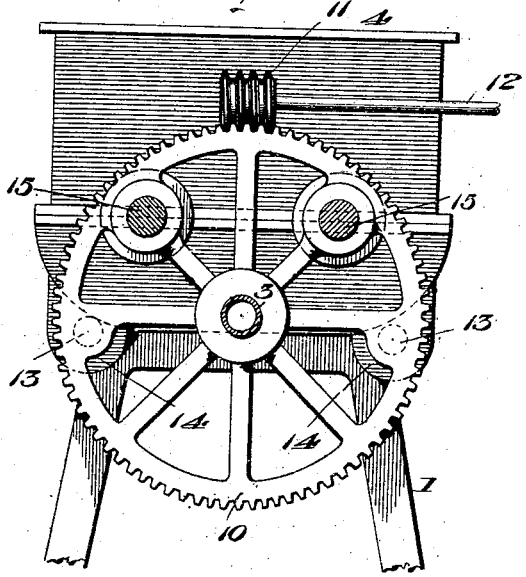

In the accompanying drawings:—Figure 1 is a plan view; Fig. 2, a side elevation; Fig. 3, an end elevation, dotted lines representing the reversed, dumping position of the mixing bowl; Fig. 4, a section on line 4—4 of Fig. 1; Fig. 5, an enlarged longitudinal section through the mixing bowl in the line of one of the mixer shafts; Fig. 6, a cross section on line 6—6 of Fig. 1; and Figs. 7 and 8, detail views showing the manner of connecting the spiral mixers to their shafts in an inclined relation to the bowl.

The mixing bowl and operating means are supported by standards 1* of any preferred construction which are surmounted by pillow blocks or bearings 2 in which the trunnion shaft 3 is adapted to turn. The mixing bowl 4, which is preferably made of detachable sections, and is provided with a double dough trough bottom 5 which has a water-jacket 6, is securely keyed or otherwise fastened. The shaft 3 is hollow for the circulation of water of suitable temperature which will enter through a packed joint 7 at one end of the shaft and emerge through a packed joint 8 at the other end, being circulated through the jacket 6 *en route* by reason of suitable openings 9 in pipe 3 (Fig. 6) and being conducted to and carried from the machine by suitable piping.

Keyed or splined to the trunnion shaft 3 is a worm-wheel 10 and disk 10ª with the former of which meshes a pinion 11 on a suitably-operated shaft 12 by means of which the mixing bowl and its trunnion shaft may be turned to any desired position, as for instance, the dumping position shown by dotted lines in Fig. 3. Worm gearing provides an automatic locking means for retaining the mixing bowl wherever positioned. In order to relieve the torsional strain of the bowl on the shaft 3, truss rods 13 are seated at their ends in suitable openings in the faces of the gear 10 and disk 10<sup>a</sup> and pass through ears 14 on the mixing bowl.

The shafts 15 of the mixers pass through apertures 16 (Fig. 6) which are somewhat larger than said shafts so that no friction can be generated at those points, said shafts having their ends received in bearings 17 in the gear 10 and disk 10<sup>a</sup>. Should any of the explosive material escape through the openings 16, it will encounter collars or washers 18 on the shafts 15 which will prevent it from reaching the bearings 17 or other parts of the machine.

At one end (although this mechanism might be duplicated) the shafts 15 carry intermeshing gears 19, whereby the mixers are driven at the same rate of revolution and one of the shafts 15 carries a gear 20 which is in mesh with a pinion 21 secured to or formed integral with a large gear 22, the pinion 21 and the gear 22 being free to turn loosely on the trunnion shaft 3. Meshing with the gear 22 is a pinion 23 on a shaft 24 which may be driven in any suitable manner to operate the mixing shafts 15.

On account of the planetary relation of the gears 20 and 21, the mixing shafts 15 may be rotated in whatever position the mixing bowl may assume so that dumping of the bowl can be effected without stopping the machine.

The spiral mixers which I have invented are especially designed for operation on explosives, particularly explosive gelatin, their object being to minimize the danger of the mixing operation and to insure a very intimate mixing of the ingredients in a minimum period of time. To this end I have invented spirals constructed and combined in a new manner and quite unlike the ordinary spiral mixers.

Each one of the shafts 15 carries a continuous spiral, shown respectively at 25 and 26, extending for the greater portion of the length thereof and terminating in one instance at A and in the other instance at B, the spirals 25 and 26 being respectively right and left hand spirals and consequently, they respectively advance or work the material from the left-hand end (Fig. 1) of the bowl toward the right-hand end in the case of the spiral 25, and from the right-hand end toward the left-hand end of the bowl in the case of the spiral 26.

The shafts 15 carry spirals 27 and 28 which are respectively opposed to the spirals 25 and 26, that is to say, the spiral 27 is a left-hand spiral and the spiral 28 is a right-hand spiral. These spirals 27 and 28 tend to work the material inward from the right and left-hand ends of the bowl in opposition to the travel imparted to the material by the respective spirals 25 and 26, thus preventing the spirals 25 and 26 from forcing any of the explosive through the openings 16. In consequence of the nature and action of the respective spirals, there are set up movements and cycles of movement of the explosive within the bowl as shown by the dotted lines. The spiral 25 works the material toward the right, the material worked back by the spiral 28 joining the flow caused by the spiral 25. Similarly, the spiral 26 works the material toward the left and the spiral 27 works back the material forced by the spiral 25. Consequently, the material is being constantly forced back from both ends of the bowl and on account of the opposing action of the spirals 27 and 28 to that of the spirals 25 and 26, the entire mass of material is kept in a cycle of circulation existing principally in the central part of the bowl.

The respective spirals are conveniently secured to their shafts by stems 29 whose ends are riveted at 30 (Fig. 7) to the shafts 15. Unlike the ordinary spiral whose edges are in the same plane located substantially at right-angles to the axis of rotation, the spirals of the present invention are disposed in a plane which cuts at an angle to the axis of rotation, that is to say, the faces of the spirals are inclined as is shown in Figs. 7 and 8, the spirals being connected to the stems 29 by broadened feet 31 and rivets 32, the inclination of the face of each spiral causing it to exert a pressing or cam action on the material between itself and the bowl 4, which assists in securing a very intimate mixture of the material, giving it very great cohesion and producing a superior explosive on account of its fine grain. The spirals rotate in their troughs in the direction shown by arrows in Fig. 6.

Having thus described my invention, what I claim as new and desire to secure by Letters Patent, is:—

1. In a mixing machine, the combination with a mixing bowl or receptacle, of two sets of spiral mixers located side by side therein, each set being composed of long and short spirals located in end to end relation, one beginning substantially where the other terminates, the long spiral of one set overlapping the long spiral of the other set and the short spirals being disposed, respectively, opposite the long spirals of the other set.

2. In a mixing machine, the combination with a mixing bowl or receptacle and trunnions secured thereto, bearings for the trunnions, whereby the bowl is mounted so that it may be turned to different positions, a rotary mixing device adapted to operate in said bowl, bearing members carried by and rotatable with the trunnions aforesaid, said bearing members being located beyond the ends of the bowl and the mixing device being journaled only in the bearing members aforesaid, and means for operating the mixing device.

3. In a mixing machine, the combination with a mixing bowl, of trunnions connected thereto, bearings for the trunnions, bearing members secured to and rotatable with the trunnions and located outside and beyond the ends of the bowl, intergeared rotary mixers operating in the bowl and journaled only in the bearing members aforesaid, planetary gearing for operating said mixers, and means for turning the bowl.

4. In a mixing machine, the combination with a pivotally mounted mixing bowl, of bearing members located outside and beyond the ends of the bowl which are rotatable therewith, a rotary mixer operating in said bowl and journaled in said members only, means for rotating said mixer, and means for turning the bowl.

5. In a mixing machine, the combination with a pivotally mounted mixing bowl, of bearing members located outside and beyond the ends of the bowl which are rotatable therewith, rotary mixers located side by side in said bowl which are journaled in said members only, means for rotating said mixers, and means for turning the bowl.

In testimony whereof, I hereunto affix my signature in presence of two witnesses.

HERBERT TALLEY.

Witnesses:
　Louis Du Hadway,
　P. C. Talley.